(12) United States Patent
Tsai

(10) Patent No.: US 7,915,861 B2
(45) Date of Patent: Mar. 29, 2011

(54) BATTERY REPLACEABLE PACK AND ELECTRONIC DEVICE WITH BATTERY REPLACEABLE PACK

(75) Inventor: Ming-Huei Tsai, Taipei (TW)

(73) Assignee: Asustek Computer Inc., Taipei (TW)

( * ) Notice: Subject to any disclaimer, the term of this patent is extended or adjusted under 35 U.S.C. 154(b) by 543 days.

(21) Appl. No.: 12/057,142

(22) Filed: Mar. 27, 2008

(65) Prior Publication Data

US 2008/0252253 A1  Oct. 16, 2008

(30) Foreign Application Priority Data

Apr. 16, 2007  (TW) .............................. 96113394 A

(51) Int. Cl.
*H02J 7/00* (2006.01)
*G01N 27/416* (2006.01)
*G08B 21/00* (2006.01)
*H01M 2/10* (2006.01)

(52) U.S. Cl. ........ 320/132; 320/134; 320/136; 320/149; 324/426; 340/636.1; 340/636.21; 429/96

(58) Field of Classification Search .................. 320/132
See application file for complete search history.

(56) References Cited

U.S. PATENT DOCUMENTS

| 5,670,267 | A  | * | 9/1997  | Lee ................................... 429/9 |
| 6,835,491 | B2 | * | 12/2004 | Gartstein et al. ................ 429/92 |
| 2003/0211382 | A1 | * | 11/2003 | Aoyama .......................... 429/96 |
| 2005/0156574 | A1 | * | 7/2005  | Sato et al. ....................... 320/134 |
| 2006/0166043 | A1 | * | 7/2006  | Eom et al. ......................... 429/7 |
| 2006/0187072 | A1 | * | 8/2006  | Bruce et al. ................. 340/636.1 |
| 2006/0208850 | A1 | * | 9/2006  | Ikeuchi et al. ................. 340/5.8 |

FOREIGN PATENT DOCUMENTS

| CN | 2145446 Y | 11/1993 |
| CN | 1412908 A | 4/2003 |
| CN | 1442912 A | 9/2003 |
| CN | 99109549.9 | 6/2004 |
| CN | 200420092984.2 | 11/2005 |

* cited by examiner

*Primary Examiner* — Edward Tso
*Assistant Examiner* — Yalkew Fantu
(74) *Attorney, Agent, or Firm* — Birch, Stewart, Kolasch & Birch, LLP

(57) ABSTRACT

A battery replaceable pack for a portable electronic device is provided. The battery replaceable pack includes a containing casing, at least one battery, a protecting circuit board, and a connector. The protecting circuit board has a charging circuit and a detecting circuit electrically connected with each other. When the portable electronic device is connected to an external power supply, the charging circuit performs a testing charge on the battery and the detecting circuit detects the status of the battery. The detecting circuit detects whether the battery is rechargeable so as to assure the battery safety. An electronic device with the battery replaceable pack is also disclosed.

20 Claims, 5 Drawing Sheets

BATTERY REPLACEABLE PACK AND ELECTRONIC DEVICE WITH BATTERY REPLACEABLE PACK

CROSS REFERENCE TO RELATED APPLICATIONS

This Non-provisional application claims priority under 35 U.S.C. §119(a) on Patent Application No(s). 096113394 filed in Taiwan, Republic of China on Apr. 16, 2007, the entire contents of which are hereby incorporated by reference.

BACKGROUND OF THE INVENTION

1. Field of Invention

The invention relates to a battery pack and an electronic device and, more particularly, to a battery replaceable pack and an electronic device thereof.

2. Related Art

To be carried conveniently, portable electronic devices (such as notebooks or personal digital assistants) can be supplied with power by battery packs, besides fixed power supply such as alternating current (AC) power supply.

For example, notebooks are usually cooperated with specific dimensions of rechargeable lithium battery packs provided by the manufacturers. However, when the battery packs is out of use, either the users buy new rechargeable lithium battery packs from the manufactory, or ask the battery manufacturer to replace the battery cells, or buy a universal battery-type emergent power supply device with both AC (a common household socket) and direct current (DC) (a lighter for vehicle 12V) which is big and heavy, the solutions above all limit the portable electronic devices such as notebooks to be used outdoors.

Further, when the power of the battery packs in notebooks is exhausted and no place for charging the battery packs, the notebooks cannot work because of lack of power. Therefore, it causes inconvenience for the users.

In addition, the battery packs have a constant shelf life. If the batteries of the battery packs cannot be used any more, or the particular types of battery packs are not sold any more, the power to drive the electronic devices can only be supplied by external AC power supply. Then, the electronic devices can not be used outdoors or any place without AC power supply even the functions thereof are still normal. This also causes great inconvenience for the users.

SUMMARY OF THE INVENTION

The invention provides a battery replaceable pack applied to a portable electronic device, wherein the battery replaceable pack includes a containing casing, at least one battery, a protecting circuit board, and a connector. The battery is provided in the containing casing. The protecting circuit board is provided in the containing casing and is electrically connected with two electrodes of the battery. The connector is provided on the protecting circuit board and is electrically connected with the protecting circuit board. The connector passes through a hole of the containing casing and partially exposed out of the containing casing to connect the portable electronic device. The protecting circuit board has a charging circuit and a detecting circuit electrically connected to each other. When the portable electronic device is connected with an external power supply, the charging circuit performs a testing charge on the battery, and the detecting circuit detects status changes of the battery.

The invention provides an electronic device including a portable electronic device and a battery replaceable pack, wherein the battery replaceable pack has a containing casing, at least one battery, a protecting circuit board, and a connector. The battery is provided in the containing casing, and the protecting circuit board is provided in the containing casing and is electrically connected with two electrodes of the battery. The connector is provided on the protecting circuit board and is electrically connected with the protecting circuit board. The connector passes through a hole of the containing casing and partially exposed out of the containing casing to connect with the portable electronic device. The protecting circuit board has a charging circuit and a detecting circuit electrically connected with each other. When the portable electronic device is connected with an external power supply, the charging circuit performs a testing charge on the battery and the detecting circuit detects status changes of the battery.

As described above, for the battery replaceable pack and the electronic device according to the invention, users can put a common marketable dry battery (or so-called primary cell) or a rechargeable battery into the containing casing to supply power to the portable electronic device. Further, since the protecting circuit board has a detecting circuit for detecting whether the battery is rechargeable, it can be determined that the battery in the containing casing is a rechargeable battery or a non-rechargeable battery. The protecting circuit board can further determine whether the charging circuit should keep charging the battery. Therefore overheating or burning caused by continuously charge to a non-rechargeable battery is avoided. The safety of the battery pack and the portable electronic device can be assured.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

A battery replaceable pack and an electronic device according to preferred embodiments of the invention are explained herein below with related drawings.

Figure 1:
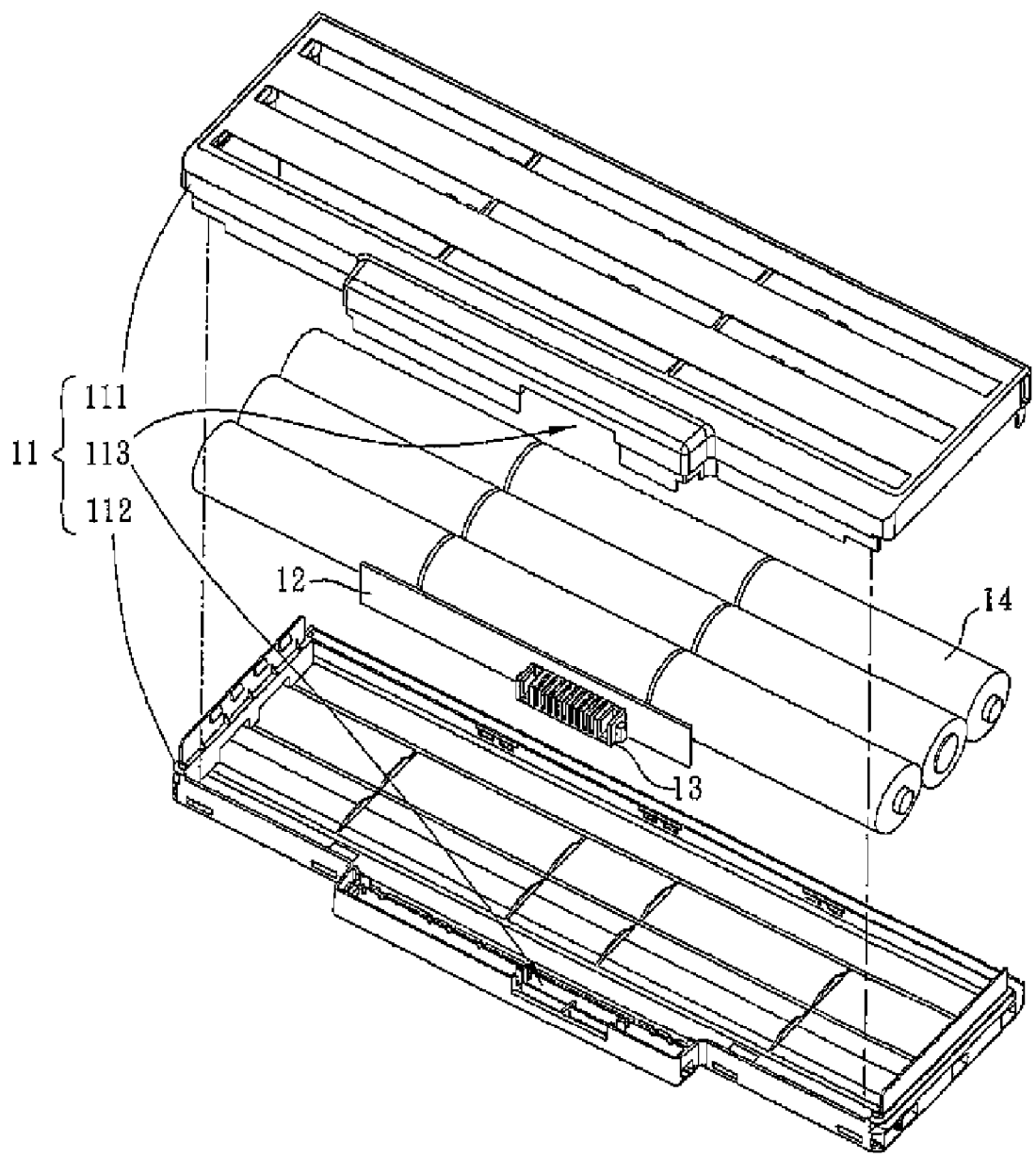
FIGS. 1 and FIG. 2 are schematic diagrams each showing a battery replaceable pack according to a preferred embodiment of the invention.
Figure 4:
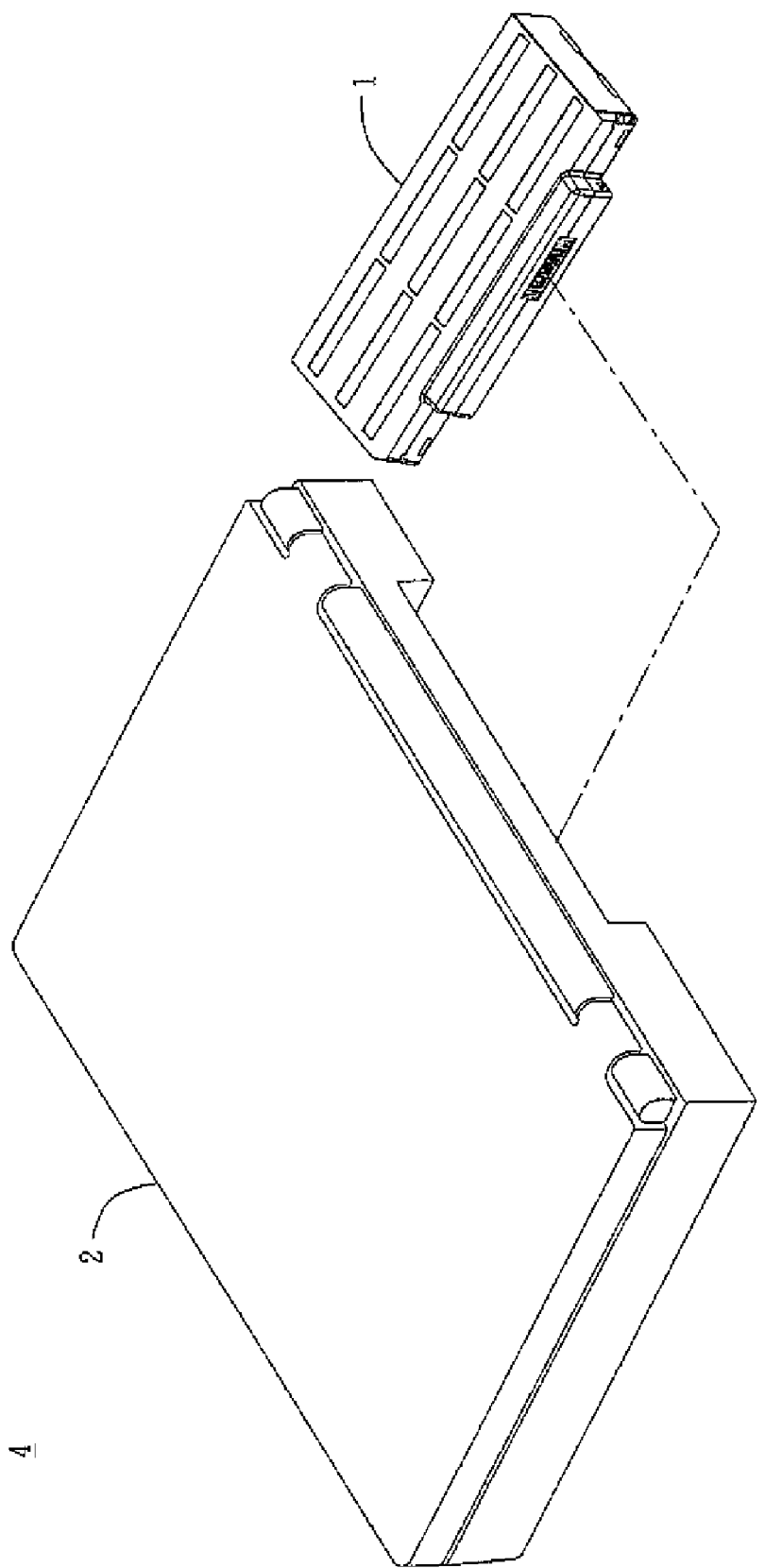
FIG. 4 is a schematic diagram showing an electronic device according to another preferred embodiment of the invention.

In FIG. 1, a battery replaceable pack 1 including a containing casing 11, a protecting circuit board 12, a connector 13, and a plurality of batteries 14 is provided in a preferred embodiment. The batteries 14 are provided in the containing casing 11, and the protecting circuit board 12 is provided in the containing casing 11 and is electrically connected with two electrodes (a positive electrode and a negative electrode) of the batteries 14. The connector 13 is provided on the protecting circuit board 12 and is electrically connected to the protecting circuit board 12. The connector 13 passes through a hole 113 of the containing casing it and partially exposes out of the containing casing 11 to connect to a portable electronic device 2 (as shown in FIG. 4). Thus the electric power can be supplied to the portable electronic device by the batteries 14 via wires on the protecting circuit board 12 and the connector 13.

Please refer to FIG. 1 again. In this embodiment, the containing casing 11 includes an upper casing 111 and a lower casing 112, and the dimension of the containing casing 11 is suitable for accommnodating the batteries 14. Of course, the dimension of the containing casing 11 is adjustable depending on actual requirements without limitations in the invention.

Further, the batteries 14 in the embodiment can be marketable common-specification batteries, such as A-size batteries to AAA-size batteries, and the batteries 14 can be non-rechargeable batteries (such as primary batteries or alkaline batteries) or rechargeable batteries (such as nickel-metal hydride batteries or nickel-chromium batteries).

Please refer to FIG. 1 again. In this embodiment, to accommodate the batteries 14 efficiently and reduce the length of the battery pack 1, the batteries 14 are first in series and are disposed abreast. Besides, the voltage of the universal batteries 14 is often lower than that of lithium batteries. Therefore, the batteries 14 are connected in electrical series to supply sufficient voltage in this embodiment. In fact, there is no limited in the number o the batteries or the batteries are in series or in parallel as long as the batteries can supply the required voltage for notebooks or other electronic devices.

Furthermore, the users can put the batteries 14 into the containing casing 11 or take the batteries 14 out of the containing casing 11 by themselves, and therefore when power of the batteries 14 is exhausted, the users can take the batteries 14 out of the containing casing 11 and change new batteries by themselves.

Figure 2:
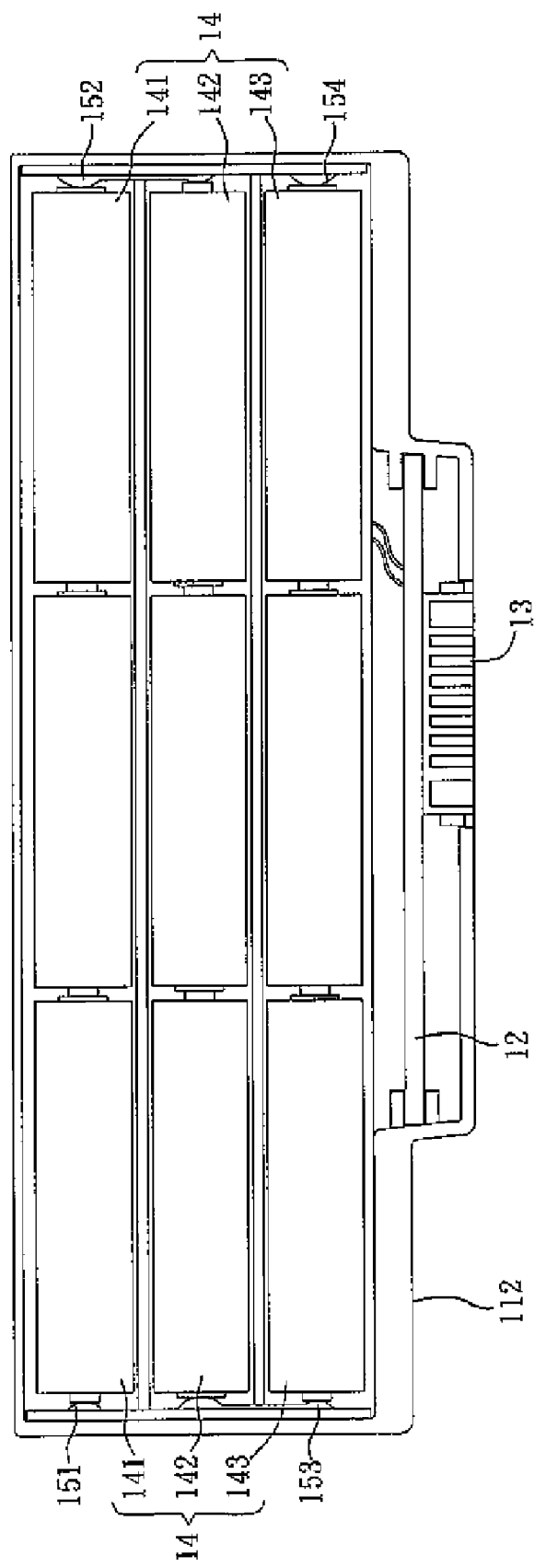

In FIG. 2, the battery pack 1 according to this embodiment has a plurality of conducting strips 151 to 154 provided at an inner surface of the lower casing 112, the conducting strips 152, 153 are used to electrically connect with the batteries in different rows, and the conducting strips 151, 154 are used to electrically connect with the batteries 14 and the protecting circuit board 12.

Please refer to FIG. 2 again. In this embodiment, the batteries are strung to be three strings, and the disposing directions of the first battery string 141 and the third battery string 143 are the same. The disposing directions of the first battery string 141 and the second battery string 142 are opposite. In detail, the positive electrode at the head of the first battery string 141 contacts the conducting strip 151, the negative electrode at the tail of the first battery string 141 and the positive electrode at the head of the second battery string 142 contact the conducting strip 152. Furthermore, the negative electrode at the tail of the second battery string 142 and the positive electrode at the head of the third battery string 143 contact the conducting strip 153, and the negative electrode at the tail of the third battery string 143 contacts the conducting strip 154. The conducting strips 151, 154 are electrically connected to the protecting circuit board 12 via wires or metal strips to make the nine batteries 14 be connected in electrical series.

Further, the protecting circuit board 12 in this embodiment is composed of a printed circuit board and several electronic components (such as a chip, a capacitor, an inductor, or a resistor and so on), and these components are assembled on the printed circuit board and electrically connected with the wires of the printed circuit board to constitute specific functional circuits of the protecting circuit board 12.

Figure 3:
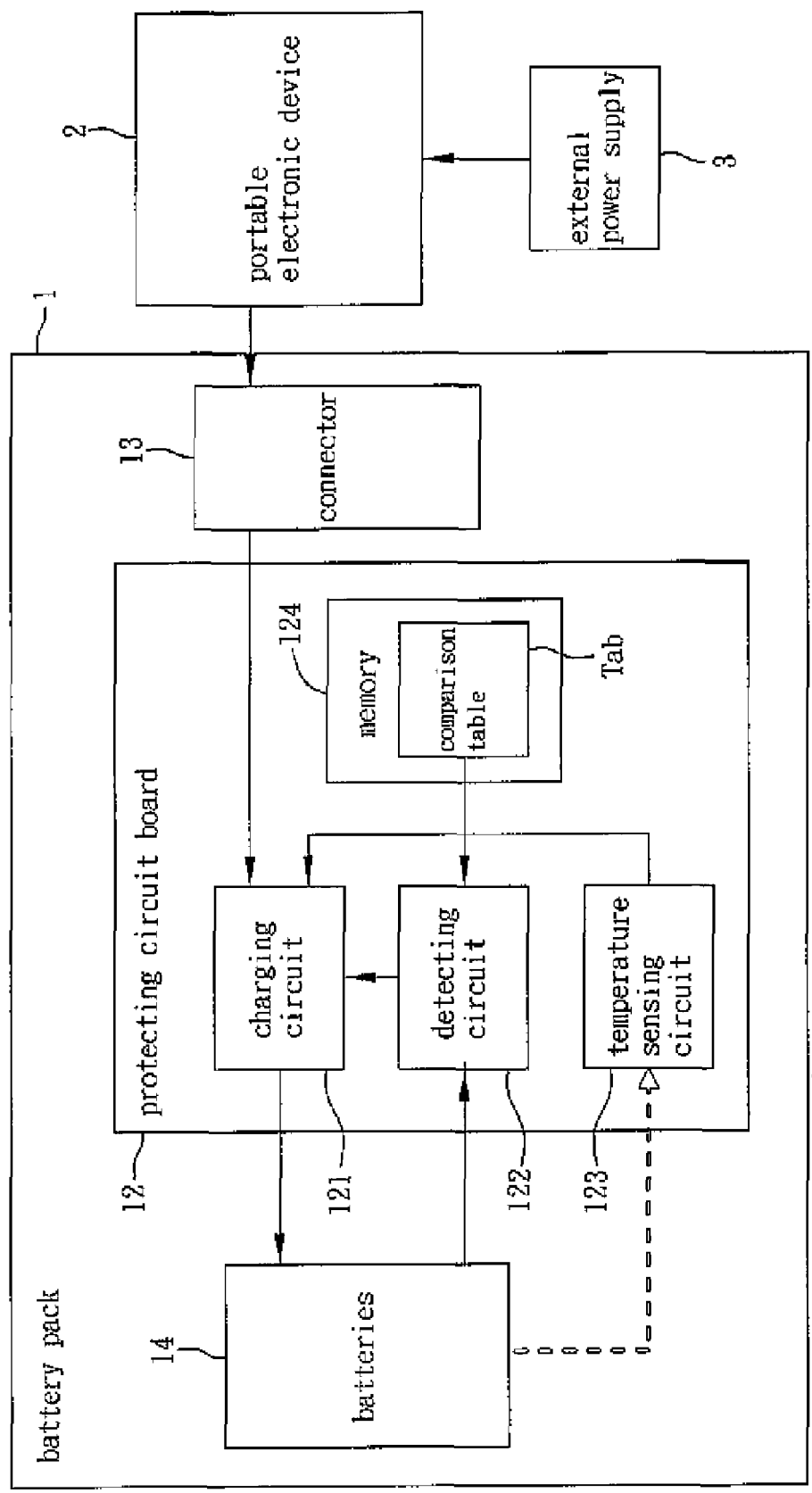
FIG. 3 is a block diagram showing a battery replaceable pack according to a preferred embodiment of the invention.

Please refer to FIG. 3. The protecting circuit board 12 in this embodiment has a charging circuit 121 and a detecting circuit 122 electrically connected with each other, and the detecting circuit 122 detects whether the batteries 14 are rechargeable batteries. In this embodiment the charging circuit 121 performs a testing charge on the batteries 14, and then the detecting circuit 122 detects variance in capacitance or voltage of the batteries 14 while charging, thus to determine whether the batteries 14 are rechargeable. Furthermore, it also can be determined whether the batteries are the rechargeable batteries according to the voltage of the batteries (the voltage of the common marketable AA-size non-rechargeable batteries is 1.5 volt, while the voltage of the rechargeable battery is 1.2 volt). The type of the batteries can be determined immediately if the voltage of the batteries is a multiple of 1.5 volt or 1.2 volt.

As described above, in detail, in a period that the charging circuit 121 has performed the testing charge to the batteries 14, if the capacitance or the voltage does not change, it can be determined that the batteries 14 are non-rechargeable. However, if the capacitance or the voltage varies, it can be determined that the batteries 14 are rechargeable.

Further, since the charging circuit 121 only performs the testing charge on the batteries 14, the charging time need not be long thus to avoid danger resulting from charging the non-rechargeable batteries.

Please refer to FIG. 3 again. When the portable electronic device 2 is connected with an external power supply 3 (such as a fixed power supply or an AC power supply), the external power supply 3 can supply the power to the protecting circuit board 12, so that the charging circuit 121 and the detecting circuit 122 can perform an initial test.

Further, in this embodiment, the power is firstly supplied to the portable electronic device 2 and then the battery pack 1 by the external power supply 3. Therefore, the charging circuit 121 can continuously charge the batteries 14.

In this embodiment, to protect the portable electronic device 2 and the battery pack 1, the detecting circuit 122 controls the charging circuit 121 to continuously charge the batteries 14 or not according to that the batteries 14 are the rechargeable batteries or the non-rechargeable batteries. If the batteries 14 are rechargeable, the external power supply 3 supplies the power to the charging circuit 121, and the detecting circuit 122 permits the charging circuit 121 to continuously charge the batteries 14. On the other hand, if the batteries 14 are non-rechargeable, the detecting circuit 122 controls the charging circuit 121 not to charge the batteries 14 while the external power supply 3 keep supplying the power to the charging circuit 121.

Further, in another embodiment, the detecting circuit 122 also outputs the type of the batteries (rechargeable or non-rechargeable) in the containing casing 11 to the portable electronic device 2, and then the portable electronic device 2 controls the charging circuit 121 to continuously charge the batteries 14 or not according to the detected results. As described above, when the batteries 14 are rechargeable, the external power supply 3 supplies the power to the charging circuit 121 and tie portable electronic device 2 controls the charging circuit 121 to continuously charge the batteries 14. On the other hand, when the batteries 14 are non-rechargeable, the portable electronic device 2 controls the charging circuit 121 not to charge the batteries 14. Therefore, the portable electronic device 2 can determine whether to supply the power to the charging circuit 121 according to the detected results, thus to achieve the control effect and avoid charging the non-rechargeable batteries.

The battery pack 1 can be also provided with a charging switch (not shown) which can also control the charging circuit 121 to continuously charge the batteries 14 or not. For example, the charging switch can be provided between the connector 13 and the charging circuit 121 to achieve the control.

The detecting circuit 122 in this embodiment also detects the capacitance or the voltage of the batteries 14 to determine the remaining power, besides the type of the batteries 14. In FIG. 3, the protecting circuit board 12 includes a memory 124 for storing a comparison table Tab, which records the corresponding relations between the voltage and the remaining power of different kinds of batteries. When the detecting circuit 122 detects the voltage of the batteries, the remaining power of the batteries 14 is obtained according to the comparison table Tab, and then the result is output to the portable electronic device 2. Therefore, the portable electronic device 2 can be determined whether the remaining power of the batteries 14 is sufficient, thus to determine whether the system should enter the sleep state, the standby state, or the shutdown state.

Further, the comparison table Tab can be stored in the portable electronic device 2. The detecting circuit 122 only outputs the detected result of the voltage to the portable electronic device 2 while the portable electronic device 2 looks up the comparison table Tab to obtain the remaining power of the batteries 14.

Please refer to FIG. 3 again. The protecting circuit board 12 further includes a temperature sensing circuit 123. When it fails to determine whether the batteries are the rechargeable according to the voltage, the temperature sensing circuit 123 can be used. The temperature sensing circuit 123 detects the temperature of the batteries 14 to control charging circuit 121 to stop charging the batteries continuously or not, hence to avoid the danger resulting from the overheating of the batteries 14.

In FIG. 4, the invention provides an electronic device 4 according to another preferred embodiment of the invention. The electronic device 4 includes the portable electronic device 2 as described in the aforementioned embodiment and a battery replaceable pack 1. In the embodiment, the portable electronic device 2 is a notebook or a personal digital assistant.

When the batteries 14 of the battery pack 1 is out of use or the power of the batteries 14 is exhausted and an external power supply is not available, the users can easily obtain the batteries of all kinds of specifications from the market and put the batteries 14 into the battery pack 1. Then the battery pack 1 can be put into a power supply container of the portable electronic device 2 to supply the power.

Figure 5:
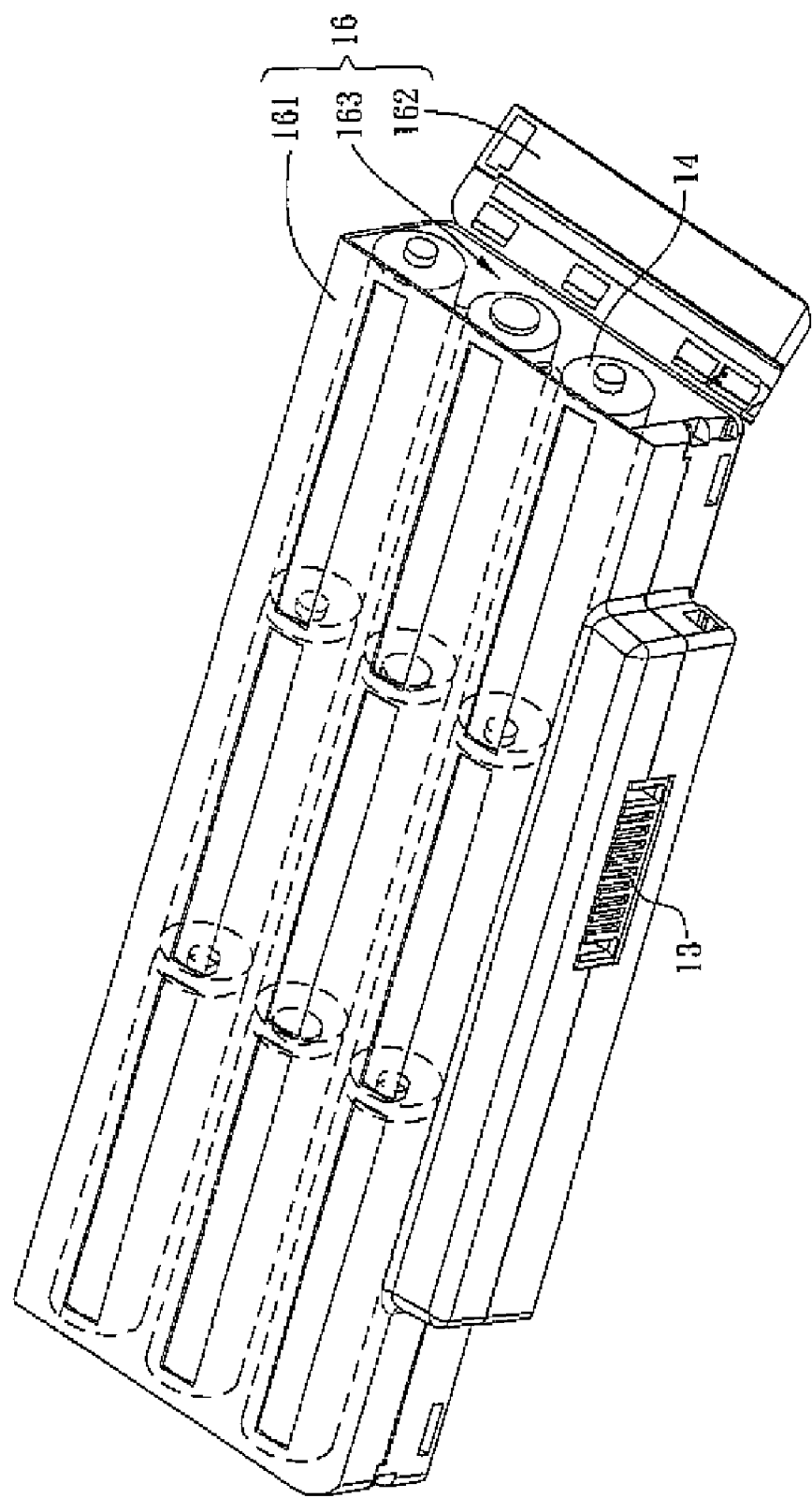
FIG. 5 is a schematic diagram showing a battery replaceable pack according to another preferred embodiment of the invention.

Please refer to FIG. 5 again. The containing casing 16 in this embodiment can be laterally opened and include a main casing 161 and a side cover 162, wherein the main casing 161 has at least one opening 163. In this embodiment, the batteries 14 are put into the main casing 161 via the opening 163, and then the opening 163 of the main casing 161 is covered with the side cover 162 to prevent the batteries 14 from falling.

Since the other components and the various patterns of the battery pack 1 have been explained in the aforementioned embodiments, here it is not described for concise purpose.

To sum up, for the battery replaceable pack and the electronic device thereof according to the invention, the users can put a common marketable dry battery or a rechargeable battery from the market into the containing casing to supply power to the portable electronic device. Further, since the protecting circuit board has a detecting circuit for detecting whether the battery is rechargeable, it can be determined that the battery in the containing casing is a rechargeable battery or a non-rechargeable battery. Then it can be further determined whether the charging circuit should continuously charge the battery, and therefore the battery can avoid overheating or burning caused by continuous charge when the battery is a non-rechargeable one to assure safety of the battery pack and the portable electronic device.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A battery replaceable pack for a portable electronic device, the battery replaceable pack comprising:
    a containing casing;
    at least one battery provided in the containing casing;
    a protecting circuit board provided in the containing casing and electrically connected to two electrodes of the battery, wherein the protecting circuit board has a charging circuit and a detecting circuit electrically connected each other; and
    a connector provided on and electrically connected to the protecting circuit board, wherein the connector passes through a hole of the containing casing to partially expose out of the containing casing to connect to the portable electronic device;
    when the portable electronic device connects to an external power supply, the charging circuit performs a testing charge on the battery, and the detecting circuit detects the status changes of the battery.

2. The battery pack according to claim 1, wherein the detecting circuit detects variance in capacitance or voltage of the battery after the testing charge is performed.

3. The battery pack according to claim 1, wherein when the battery is rechargeable, the external power supply supplies power to the charging circuit, and the detecting circuit controls the charging circuit to continuously charge the battery; and when the battery is non-rechargeable, the detecting circuit controls the charging circuit not to charge the battery.

4. The battery pack according to claim 1, wherein when the battery is rechargeable, the external power supply supplies power to the charging circuit and the portable electronic device controls the charging circuit to continuously charge the battery, and when the battery is non-rechargeable, the portable electronic device controls the charging circuit not to charge the battery.

5. The battery pack according to claim 1, wherein the detecting circuit detects the status change of the capacitance or voltage of the battery to determine the remaining power of the battery.

6. The battery pack according to claim 1, wherein the protecting circuit board further comprises:
    a temperature sensing circuit for sensing temperature of the battery.

7. The battery pack according to claim 1, wherein a plurality of batteries are provided in the containing casing, and the plurality of batteries are disposed abreast and connected in electrical series.

8. The battery pack according to claim 1, wherein the containing casing comprises an upper casing and a lower casing, and the upper casing and the lower casing form the hole for the connector to pass through.

9. The battery pack according to claim 1, wherein the containing casing comprises a main casing and a side cover, the main casing has at least one opening, the battery is provided in the main casing, and the side cover covers the opening of the main casing.

10. The battery pack according to claim 1, farther comprising:
    at least one conducting strip provided at an inner surface of the containing casing and electrically connecting the battery and the protecting circuit board.

11. An electronic device, comprising:
    a portable electronic device; and
    a battery replaceable pack applied to the portable electronic device, wherein the battery pack has a containing casing, at least one battery, a protecting circuit board, and a connector; the battery is provided in the containing casing, the protecting circuit board is provided in the containing casing and is electrically connected with two electrodes of the battery, the connector is provided on the protecting circuit board and is electrically connected with the protecting circuit board, and the connector passes through a hole of the containing casing to be partially exposed out of the containing casing to connect with the portable electronic device;
    wherein the protecting circuit board has a charging circuit and a detecting circuit electrically connected with each other, and when the portable electronic device is connected to an external power supply, the charging circuit performs a testing charge on the battery and the detecting circuit detects the status changes of the battery.

12. The electronic device according to claim 11, wherein the detecting circuit detects variance in capacitance or voltage of the battery after the testing charge is performed.

13. The electronic device according to claim 11, wherein when the battery is rechargeable, the external power supply supplies power to the charging circuit and the detecting circuit controls the charging circuit to continuously charge the battery, and when the battery is non-rechargeable, the detecting circuit controls the charging circuit not to charge the battery.

14. The electronic device according to claim 11, wherein when the battery is rechargeable, the external power supply supplies power to the charging circuit and the portable electronic device controls the charging circuit to continuously charge the battery, and when the battery is non-rechargeable, the portable electronic device controls the charging circuit not to charge the battery.

15. The electronic device according to claim 11, wherein the detecting circuit detects the status change of the capacitance or voltage of the battery to determine remaining power of the battery.

16. The electronic device according to claim 11, wherein the protecting circuit board further comprises:
    a temperature sensing circuit for sensing temperature of the battery.

17. The electronic device according to claim 11, wherein a plurality of batteries are provided in the containing casing, and the plurality of batteries are disposed abreast and connected in electrical series.

18. The electronic device according to claim 11, wherein the containing casing comprises an upper casing and a lower casing, and the upper casing and the lower casing form the hole for the connector to pass through.

19. The electronic device according to claim 11, wherein the containing casing comprises a main casing and a side cover, the main casing has at least one opening, the battery is provided in the main casing, and the side cover covers the opening of the main casing.

20. The electronic device according to claim 11, wherein the battery pack further comprises,
    at least one conducting strip provided at an inner surface of the containing casing and electrically connecting the battery and the protecting circuit board.

* * * * *